United States Patent [19]

Kamiya et al.

[11] 4,163,166
[45] Jul. 31, 1979

[54] FIELD WINDING ASSEMBLY FOR ROTOR IN ELECTRIC ROTARY MACHINE

[75] Inventors: Hiroyuki Kamiya, Hitachi; Ken Takahashi, Ibaraki; Seiji Watanabe, Hitachi; Yasuyuki Wachi, Takahagi, all of Japan

[73] Assignee: Hitachi, Ltd., Japan

[21] Appl. No.: 817,743

[22] Filed: Jul. 21, 1977

[30] Foreign Application Priority Data

Jul. 23, 1976 [JP] Japan .................. 51-88534

[51] Int. Cl.$^2$ ............................ H02K 3/36
[52] U.S. Cl. ..................... 310/215; 310/214
[58] Field of Search ............ 310/214, 215, 194, 213, 310/64; 336/185

[56] References Cited

U.S. PATENT DOCUMENTS

| | | | |
|---|---|---|---|
| 1,564,449 | 12/1925 | Sayre | 310/215 |
| 1,675,419 | 7/1928 | Myers | 310/215 UX |
| 2,169,097 | 8/1939 | Hall | 310/215 |
| 2,180,983 | 11/1939 | Hall | 310/215 |
| 2,819,514 | 1/1958 | Polard | 310/215 |
| 3,235,762 | 2/1966 | Brammerlo | 310/214 |
| 3,735,169 | 5/1973 | Balke | 310/214 |

FOREIGN PATENT DOCUMENTS

| | | | |
|---|---|---|---|
| 1191474 | 4/1965 | Fed. Rep. of Germany | 310/214 |
| 1613003 | 8/1970 | Fed. Rep. of Germany | 310/214 |
| 2421528 | 11/1975 | Fed. Rep. of Germany | 310/215 |
| 220755 | 8/1924 | United Kingdom | 310/214 |

*Primary Examiner*—R. Skudy
*Attorney, Agent, or Firm*—Craig and Antonelli

[57] ABSTRACT

A field winding assembly for rotor in electric rotary machine which is to be mounted into a substantially rectangular open slot formed in the rotor and secured by a wedge disposed in the slot closer to its open side, wherein the field winding assembly comprises a conductor section to be mounted into the slot, and an insulator for insulating the conductor section from the slot walls and the wedge and composed of a lower U-shaped insulating member covering the sides of the conductor section adjacent to bottom and side walls of the slot and an upper U-shaped insulating member formed to cooperate with the lower U-shaped insulating member for completely surrounding the conductor section and to have a base side adjacent to the wedge when assembled in the slot. The upper U-shaped insulating portion which is flexible for lateral contraction and expansion of the upper insulating member whereby the stress imported to the upper U-shaped insulating member is absorbed by the flexible characteristic of that portion.

8 Claims, 8 Drawing Figures

FIELD WINDING ASSEMBLY FOR ROTOR IN ELECTRIC ROTARY MACHINE

LIST OF PRIOR ART REFERENCES (37 CFR 1.56(a))

The following references are cited to show the state of the art:
U.S. Pat. No. 2,724,064
Canadian Pat. No. 603,054
Japanese Patent Publication No. 41,882/74

BACKGROUND OF THE INVENTION

1. Field Of The Invention

The present invention relates in general to an improvement of a field winding assembly provided in a rotor for an electric rotary machine and in particular the invention is concerned with an improvement of insulators for winding conductors mounted in winding slots formed in the rotor core.

2. Description Of The Prior Art

As is known in the art, in the case of an electric rotary machine, the field winding assembly for a rotor is composed of a plurarity of windings each being formed of a stack of conductors and mounted into respective one of slots formed in the outer peripheral portion of a rotor core and extending radially outwardly. With a view to preventing creep current from flowing to the rotor core from the winding conductors, an insulating layer is provided so as to enclose the whole stacked winding conductors in each slot in a continuous manner. For example, in the case of a rotary machine of relatively small capacity, the stacked conductors in each slot are wound in a continuous manner with an insulation tape or sheet formed of insulating material such as mica, asbestos or the like. However, in the case of the rotary machine such as a turbine generator whose capacity has been increased over the years, the windings thereof are apt to undergo great thermal expansion and vibrations and to be subjected to a large centrifugal force. In view of such adverse conditions, the insulating layer provided between the rotor core and the conductors must be capable of well withstanding such adverse conditions. In particular, as the capacity or output of a rotary machine is increased, deformation of the winding conductor due to thermal expansion and contraction thereof produced upon repeated starting and stopping operations in the running of the rotary machine will become greater on the one hand, while the insulating layer will not be subjected to any appreciable deformation on the other hand, thus involving relative sliding or abrasive movements between the conductors and the surrounding insulation layer. As a result, the insulating layer will suffer from deformation or damage, which will eventually lead to generation of cracks after long the insulating layer, in operation of the rotary machine. In this connection, it will be noted that the danger of the insulating layer being cracked will become more serious, as the capacity of the rotary machine becomes larger, because the cross-sectional area of the winding conductors and hence the weight thereof are increased as a function of the capacity of the rotary machine and the abrasive relative movement between the conductors and the insulating layer would thus occur under correspondingly increased centrifugal force.

In an attempt to obviate the difficulties described above, there have been already proposed the use of an insulating layer having great thermal and mechanical strength which is, for example, made of glass fibers impregnated with a synthetic resin in a predetermined configuration so as to be suitably disposed between the stacked conductors and the inner walls of the slot. Since such type of a shaped insulation material or layer and in general those having high thermal and mechanical strength are difficult to be bent or folded without incurring deterioration in the mechanical and electrical properties, it is common practice to provide a set of insulating members each formed in a U-like channel bar and adapted to be combined with each other to completely surround the conductors as mounted in each slot.

The insulating layer of the latter structure has proven to be better than the former conventional insulators. However, careful experiments carried out by the inventors have shown that cracks are still produced at some locations such as corner portions of the U-like insulating layer interposed between the securing wedge and the underlying winding conductor upon long running of the rotary machine. More in particular, some distortion stress (remnant stress) as produced during the forming work of the insulation material into the U-like channel bar will inevitably remain at corner portions thereof. Thus, in the operation in which a centrifugal force in the range of 600 to 800 kg/cm$^2$ is produced, for example, in the case of a turbine generator having rated output on the order of 500 MVA, the corner portions of the upper U-like insulating layer will be subjected to great stresses or abrasive effect due to thermal expansion and/or contractions in the longitudinal and transversal directions of the winding conductor as well as complicated deformation of the conductors and will eventually be cracked. Of course, it can be readily contemplated to increase the thickness of the U-like insulating layer in order to obtain a more rigid structure. However, this requires correspondingly increased depth and width of the winding slot, which in turn will result in an increased size of the rotor and hence of the rotary machine.

Although the function of the insulating layer is simply to prevent the occurrence of a short-circuit between the field winding and the rotor core, difficult problems are involved which have been desired to be solved in respect of the design or construction thereof, as will be understood from the above description.

SUMMARY OF THE INVENTION

An object of the invention is to provide a field winding assembly having an insulator which is capable of satisfactorily preventing occurrence of creep current even under a great centrifugal force as in the case of a large capacity rotary machine.

Another object of the invention is to provide an improved structure of a field winding assembly having an insulating layer interposed between the winding conductors thereof and a wedge for securely holding the conductors in which the insulation in a slot is effectively protected from deformation, damage or cracks.

Still another object of the invention is to protect effectively the insulating layer from the deformation, etc. without resorting to additional provision of a specific reinforcing means.

With the above objects in view, there is proposed according to a main feature of the invention that each of the insulating U-like channel layers interposed between the winding conductor and the securing wedge is provided with means for allowing a portion extending along the substantially center longitudinal axis of the channel layer to be flexible for contraction and expansion in its transversal direction.

BRIEF DESCRIPTION OF THE DRAWINGS

The above and other objects, features and advantages of the invention will become more apparent from the detailed description of preferred embodiments of the invention taken in conjunction with the accompanying drawings, in which.

DETAILED DESCRIPTION OF THE PREFERRED EMBODIMENTS

Figure 1:
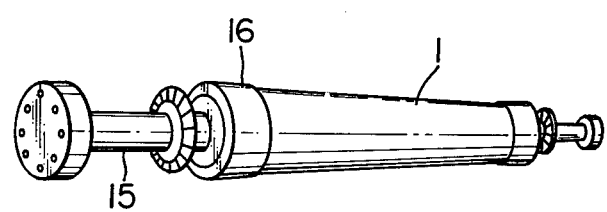
FIG. 1 is a perspective view showing a rotor of an electric rotary machine to be provided with field windings according to the teachings of the invention.

Now, the invention will be described in detail in conjunction with exemplary embodiments shown in the drawings.

FIG. 1 shows generally a rotor to which the field windings of the invention are mounted. The field windings are invisible from the outside and therefore not shown in the figure. However, it will be appreciated that the field windings are each constituted by conductors wound and accommodated within a rotor core 1. More particularly, the core 1 is formed integrally with a rotor shaft 15 and formed with a predetermined number of slots in which the center portions of the field windings are mounted while the end portions thereof are disposed within retaining rings 16 positioned at both ends of the rotor core 1.

Figure 2:
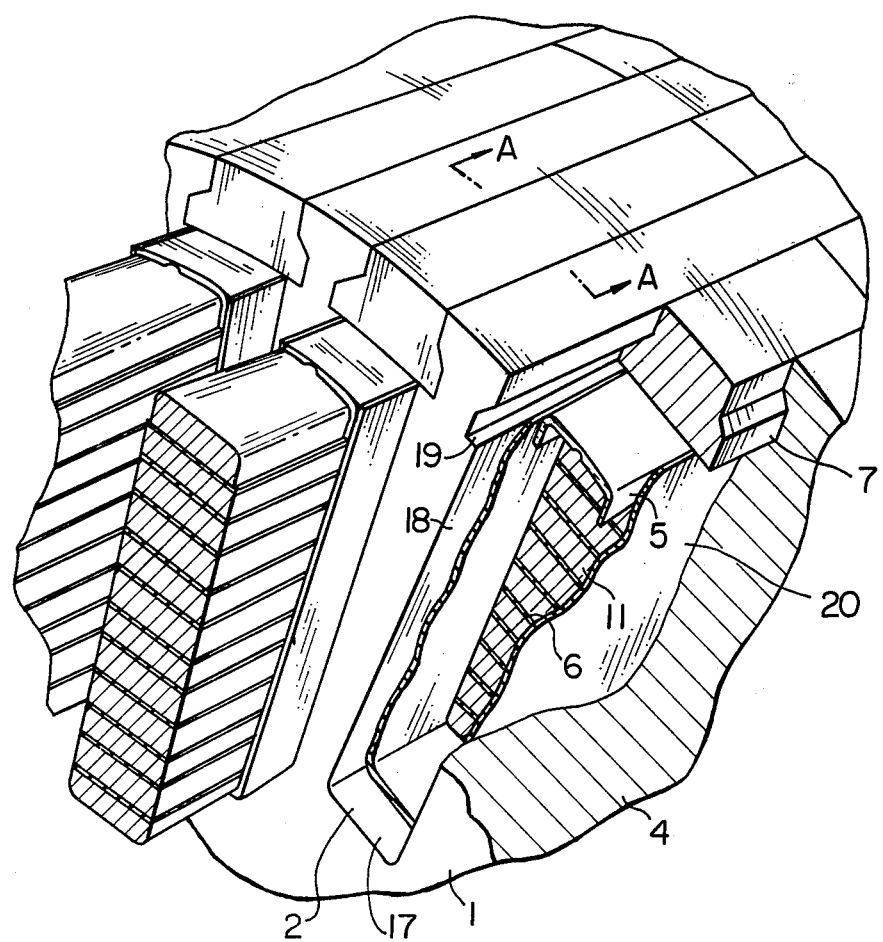
FIG. 2 is a fragmental perspective view of an end portion of the rotor showing an arrangement of winding conductors along with associated insulation means with some parts being broken away.
Figure 3:
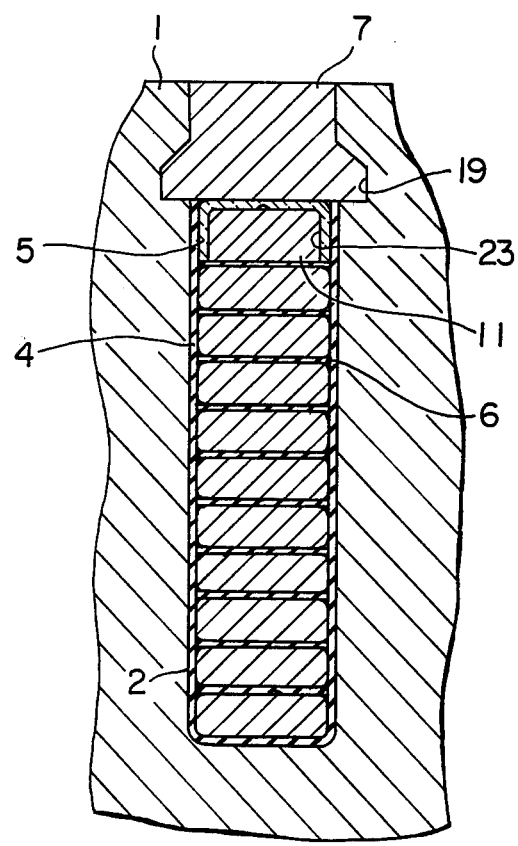
FIG. 3 is a sectional view taken along the line A—A in FIG. 2.

Arrangement of the conductors constituting the field winding as mounted in a slot of the rotor core can be clearly understood by referring to FIG. 2 which is an enlarged fragmental perspective view of a part of the rotor obtained by removing the retaining ring 16, as well as FIG. 3 which shows a fragmental cross-sectional view of the rotor. As can be seen from these figures, the rotor core 1 is formed with slots 2 each having a bottom and side walls 17 and 18 and opened in the radial direction. Additionally, the side walls of each slot are formed with grooves 19 of a dore-tail configuration closer to the outer peripheral portion of the rotor to receive a wedge 7 of a complementary configuration. The conductors constituting the field winding are denoted by reference numeral 11. A predetermined number of the conductors 11 are accommodated within each slot 2 in the form of stacked layers with insulation layers 6 being interposed between adjacent conductor layers 11. Electrical insulation between the winding conductors 11 and the rotor core 1 is assured by a main insulator 20 which includes a pair of U-like channel bars 4 and 5 of insulation material. The upper channel bar 5 having a U-like cross-section is fitted into the lower channel bar 4 so as to completely surround the winding conductors, as best seen from FIG. 3. It will be noted that the conductors 11, the interposed insulation layers 6 and the main insulator 20 accommodated within each slot are protected from slipping out of the slot under centrifugal force produced upon rotation of the rotor by means of a wedge member 7, which thus serve to hold the above elements in place.

Cooling system for the winding conductors is of little interest for the invention and therefore omitted from the illustration. However, it will be readily appreciated that, in the case of a rotary machine of a large capacity, the winding conductor may be constituted by a hollow bar having a passage formed therein to permit a cooling medium to flow therethrough or alternatively cooling passages may be formed in the rotor core itself, thereby to carry away heat as produced by the winding conductors. For the purpose of simplifying the figure, however, such cooling system is not shown in the illustrated embodiment.

During rotation of the rotor, the winding conductors 11 are subjected to centrifugal forces and tend to move radially toward the outside. Such tendency of the winding conductors is prevented by the wedge member 7 against which the centrifugal force is applied through the upper U-like insulating channel bar 5. Under such circumstances, the upper U-like channel member 5 undergoes a very great pressing force and simultaneously abrasive action by the winding conductor, which would eventually involve damage and production of cracks in the upper U-like channel bar 5 particularly in corner portions thereof, resulting in deterioration of the insulating or dielectric property thereof, as described hereinbefore.

With the present invention, it is intended to suppress or reduce such undesirable effects. To this end, there is provided according to the present invention a novel and improved structure of the upper U-like channel bar 5 which will be described in the following.

Figure 4:
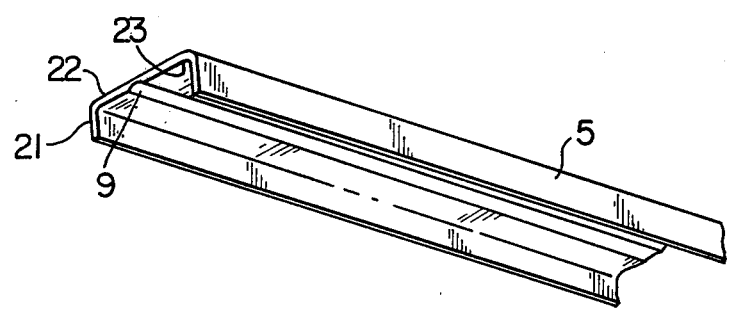
FIG. 4 is a perspective view of a single U-like insulating channel bar adapted to be disposed at top portion of the winding slot according to an embodiment of the invention.

Referring to FIG. 4 which is a perspective view showing an embodiment of the upper insulating channel bar 5 constituting a part of the main insulator 20 for enclosing therein the conductor 11 when disposed in the core slot 2, as described hereinbefore. According to the invention, the insulating channel bar is in the form of an elongated channel bar having a length slightly greater than the length of the part of the winding to be contained in the core slot and hence greater than the axial length of the rotor core. The insulating channel bar 5 may be formed of an insulating material such as glass fibers impregnated with synthetic resin and have side skirt or leg portions 21 and a bridge or base portion 22. The intersecting portions between the side skirts 21 and the base 20, i.e. corner portions 23 should be preferably rounded. It will further be noted that the insulating channel bar 5 is formed with a groove 9 in the base portion 22 which extends longitudinally over the whole length of the channel bar 5 substantially along a longitudinal center line of the base portion 22. Although the groove 9 is shown as formed in the inner surface of the base portion 22 facing toward the adjacent winding conductor in FIG. 4, it should be appreciated that the groove may be formed at the opposite or outer side of the base portion 22. Further, the number of such grooves 9 is not restricted to one as is in the case of the illustrated embodiment but a plurality of such grooves may be provided.

The insulating channel bar 5 having the structure described above provides the following actions and effects. During the rotation of the rotor assembly, the upper insulating channel bar 5, interposed between the winding conductors 11 and the wedge member 7 receives the centrifugal force and abrasive force due to deformation of the winding conductors contained in the associated slot. However, by virtue of the provision of the groove 9, the middle region or portion of the base 22 of the upper insulating channel bar 5 extending longitudinally along the groove 9 has a greater flexibility for lateral contraction and expansion, than any other parts thereof. In other words, the longitudinal middle region of the upper channel bar 5 including the groove 9 is more contractile and expandable than any other remaining portions of the channel bar 5 and serves, as a means for absorbing the adverse abrasive or vibratory action applied thereto due to deformation of the winding conductors and, as a result, the other portions of the upper channel bar 5 having reduced mechanical strength and in particular the weak corner portions thereof where residual stress is more prominent can be protected from injury or being cracked due to the above action.

Figure 5:
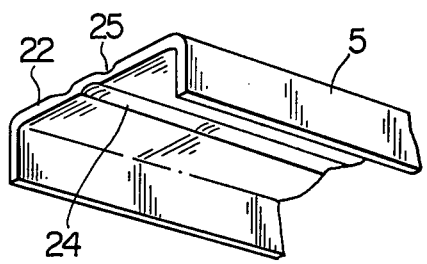
FIGS. 5 to 7 show variations of the insulating U-like channel bars disposed at the top portion of the associated slots according to the invention.

In the above embodiment, the means for providing flexibility to absorb the undesirable action of the winding conductors during the rotation of the rotor has been explained as a specific groove formed in the base of the upper insulating channel bar. However, other structures or arrangements can be conceived within the scope of the invention. For example, the flexibility providing means is constituted by a V-like groove in place of the U-like cross-section groove in the above embodiment. Further, in the rotary machine in which greater deformations of the winding conductors will be expected a plurality of grooves 24 and 25, as shown in FIG. 5, may be provided in both the outer and inner surfaces of the base portion 26 of the insulating channel bar 5 at positions offset to one another.

Figure 6:
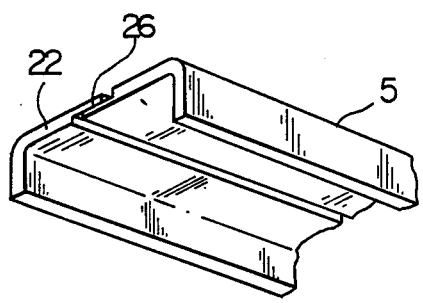
Figure 7:
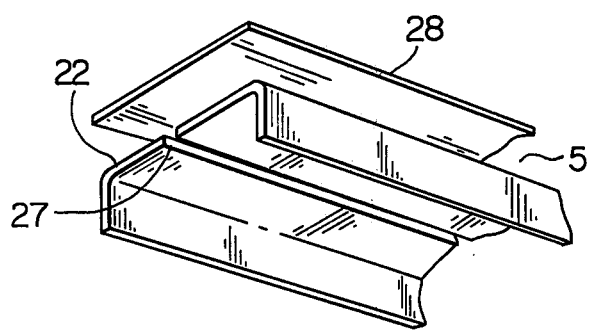

FIGS. 6 and 7 show other structures of the upper insulating channel bar according to the invention which is particularly adapted to be easily assembled and suited for large capacity rotary machines. In the case of the embodiment shown in FIG. 6, the upper U-like channel bar 5 is longitudinally divided into two pieces, wherein the opposite edges of the two pieces are formed with respective stepped portions 26 of complementary configuration so that the stepped portions 26 are slideably superposed on each other. With such structure, the upper insulating U-like channel bar can be easily contracted or expanded in the lateral directions.

Figure 8:
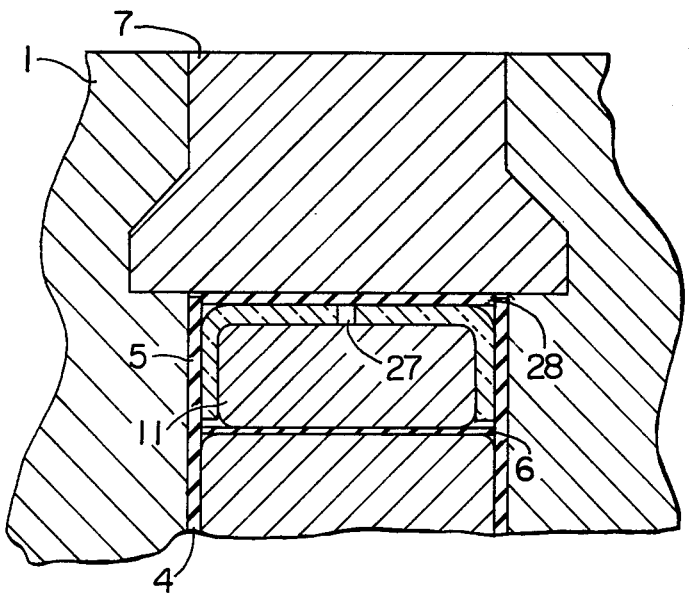
FIG. 8 shows in a cross-section the U-like channel bar shown in FIG. 7 in the assembled state.

On the other hand, in the case of another embodiment of the invention shown in FIG. 7, a slit 27 is formed in the base portion 22 along the substantially longitudinal center line thereof to divide the U-like channel bar 5 into two specially separated symmetrical pieces. It will be noted that no stepped portions such as those shown in FIG. 6 are formed in the divided pieces. Instead, an insulating thin plate 28 is disposed at the outer side of the base portion 22 of the channel bar 5. Upon assembly, the U-like channel bar 5 with the thin plate 28 disposed thereon is inserted between the leg portions of the lower U-like channel bar 4 in a manner as shown in FIG. 8. In more particular, the upper U-like channel bar 5 divided into the two pieces by the slit 27 is disposed on the winding conductors 11 with the insulating thin plate 28 being interposed between the divided U-like channel bar 5 and the wedge 7. It seems that addition of such insulation plate 28 would possibly need to increase the depth of the slot formed in the rotor core. However, in consideration of the fact that the insulation plate 28 may be formed of a simple flat sheet material without having undergone any forming or shaping treatment and it thus has a high mechanical strength with negligible remanent stress, and that the plate 28 can be made sufficiently thin so that creep current may be prevented by it, there is no fear that the depth of the slot should be significantly increased due to the provision of the insulating plate 28, although such value of thickness may vary in dependence upon the insulating materials as used for the plate 28.

In the above embodiments, it is desired to use, as a base material, laminations of plain-weave glass cloths of 1~2 mm thickness in whole and to impregnate a thermosetting resin such as thermosetting expoxy resin a polyester resin after forming into a desired shape. In an insulating channel bar having a groove or grooves, it is desired to use a base material having a 2 mm thickness so that a thickness of 1.2 mm is still retained at the portion where the grooves are formed, in order to assure a desired insulating resistance at that portion. In the embodiments of FIG. 7, it has been found that the insulating plate 28 made of the same material as that of the channel bar 27, but having a 3 mm thickness gives a sufficient insulating resistance.

As will be appreciated from the foregoing description, the invention has proposed a novel and improved structure of the field winding assembly for rotary machines in which the main insulator for insulating the conductors from the rotor is provided to include means for providing flexibility against contraction and expansion and is mounted in a slot to have the means interposed between the winding conductors contained in the slot and the wedge member for holding the winding conductors securedly in place. With such structure, any undesirable displacement or deformation of the winding conductors due to the centrifugal force generated upon rotation of the rotor can be absorbed by the flexibility providing means of the insulator without incurring any adverse influence of the winding conductors onto the corner portions of the insulator which otherwise would often result in cracks and possible generation of creep current, as is in the case of the hitherto known structure.

We claim:

1. A field winding assembly for rotors in electric rotary machines which is mounted into an open slot formed in the rotor and secured by a wedge which is disposed in said slot closer to its open side, said field winding assembly comprising a conductor section mounted into said slot together with an insulator, said insulator including a lower insulating member of a substantially U-shaped cross-section for covering sides of said conductor section which are adjacent to bottom and side walls of said slot, and an upper insulating member of a substantially U-shaped cross-section for completely surrounding said conductor section in cooperation with said lower insulating member and having a base portion which is disposed adjacent to said wedge in said slot, and means provided in said base portion of said upper member to provide said upper insulating member with flexibility for lateral contraction and expansion, wherein said flexibility providing means comprises a plurality of grooves formed in said upper insulating member at both inner and outer surfaces of said base portion in positions offset to one another.

2. A field winding assembly for a rotor in an electric rotary machine which is mounted into an open slot formed in the rotor and secured by a wedge which is disposed in said slot closer to its open side, said field winding assembly comprising a conductor section mounted into said slot together with an insulator, said insulator including a lower insulating member of a substantially U-shaped cross-section for covering the sides of said conductor section which are adjacent to bottom and side walls of said slot, an upper insulating member of a substantially U-shaped cross-section for completely surrounding said conductor section in cooperation with said lower insulating member and having a base portion which is disposed adjacent to said wedge in said slot, said base portion of said upper insulating member being formed with a slit extending along a substantially longitudinal center line of said base portion, and an insulating plate interposed between said wedge and said base portion.

3. A field winding assembly as set forth in claim 2, wherein said interposed insulating plate is disposed between both portions of said lower insulating member covering the sides of said conductor section adjacent to the side walls of said slot.

4. A field winding assembly as set forth in claim 2, wherein said base portion of said upper insulating member is divided into two separate longitudinal sections by said slit, said two sections being relatively movable with respect to each other.

5. A filed winding assembly for a rotor in an electric rotary machine which is mounted into an open slot formed in the rotor and secured by a wedge which is disposed in said slot closer to its open side, said field winding assembly comprising an elongated conductor body having opposite sides extending respectively longitudinally adjacent to side walls of said slot, an upper side disposed at the open side of said slot and a bottom side disposed adjacent to the bottom wall of said slot; a lower insulating member of substantially U-shaped cross-section having legs respectively covering said opposite sides of said conductor body, and a base portion covering said bottom side of said conductor body; and an upper insulating member of substantially U-shaped cross-section for completely surrounding said conductor body in cooperation with said lower insulating member and having a base portion disposed between said upper side of said conductor body and said wedge, said base portion of said upper insulating member being formed with grooves at its inner and outer surfaces in positions offset to one another to provide said upper insulating member with flexibility for lateral contraction and expansion.

6. A field winding assembly for a rotor in an electric rotary machine which is mounted into an open slot formed in the rotor and secured by a wedge which is disposed in said slot closer to its open side, said field winding assembly comprising an elongated conductor body having opposite sides extending respectively longitudinally adjacent to side walls of said slot, an upper side disposed at the open side of said slot and a bottom side disposed adjacent to the bottom wall of said slot; a lower insulating member of substantially U-shaped cross-section having legs respectively covering said opposite sides of said conductor body, and a base portion covering said bottom side of said conductor body; an upper insulating member of substantially U-shaped cross-section for completely surrounding said conductor body in cooperation with said lower insulating member and having a base portion disposed between said upper side of said conductor body and said wedge, said base portion of said upper insulating member being formed with a slit extending substantially along its longitudinal center line; and an insulating plate interposed between said wedge and said base portion of said upper insulating member.

7. A field winding assembly as set forth in claim 6, wherein said interposed insulating plate is disposed between respective inner surfaces of said legs of said lower insulating member.

8. A field winding assembly as set forth in claim 6, wherein said base portion of said upper insulating member is divided into two separate longitudinal parts by said slit, said two parts being relatively movable with respect to each other.

* * * * *